United States Patent

[11] 3,620,622

[72] Inventor Norton Goodwin
824 Connecticut Ave. N.W., Washington, D.C. 20006
[21] Appl. No. 738,028
[22] Filed June 18, 1968
[45] Patented Nov. 16, 1971

[54] MICROPHOTOGRAPHIC RECORD AND METHOD
21 Claims, 4 Drawing Figs.

[52] U.S. Cl. 355/43, 352/236, 352/240, 355/64, 355/77
[51] Int. Cl. G03b 27/32
[50] Field of Search 355/64, 55, 43, 40, 77, 62, 44, 45, 65; 352/236, 240

[56] References Cited

UNITED STATES PATENTS

| | | | |
|---|---|---|---|
| 2,084,450 | 6/1937 | Paris | 355/55 |
| 3,007,369 | 11/1961 | Squassoni et al. | 355/43 |
| 2,496,329 | 2/1950 | Briechle et al | 355/62 |
| 3,286,586 | 11/1966 | Whitney | 355/44 X |

*Primary Examiner*—Samuel S. Matthews
*Assistant Examiner*—Richard A. Wintercorn
*Attorney*—James Richard Gaffey

ABSTRACT: A regular microphotographic record is produced from documents consisting in a multiplicity of regular and irregular graphic records by making an intermediate volume of photographic records and photographically collating the images therefrom. The intermediate volume has uniform graphic field storage areas in which graphic fields of uniform width are fixed and may be produced from document records having graphic fields of varying width by photographing such fields individually at the appropriate reduction ratio. This volume may contain marks which can be sensed to aid in the collating process.

INVENTOR
NORTON GOODWIN

BY

ATTORNEY

MICROPHOTOGRAPHIC RECORD AND METHOD

The amount of graphic information which can be efficiently accessed from a fixed point of view is gnomonically limited by the minimum subtense angle at which the normal human eye can perceive a point, and the maximum angle which a line of text, held at sufficient distance for legibility, may subtend without loss of reading efficiency. The minimum limit of point resolution for the human eye is generally held to be about 1 minute of arc (Max Boren and Emil Wolf, *Principles of Optics*, Pergammon Press, N.Y. (1965)). The 20/20 vision line of eye charts has Snellen characters which are of a height to subtend 4.89 minutes of arc at the specified reading distance.

Studies of the legibility of macrographic print show that there is a limit to the number of alphanumeric characters that may be set to the line of text before significant loss in reading speed is detectable. This number is independent of the size of the typeface. For example, 12-point text with two-point leading has been found to be about equally legible in a variety of typefaces when set in line lengths of 17 to 33 picas (2.8 to 5.5 inches). A significant retardation in reading speed was found when the same text was set in the same typeface at 41 to 45 pica line lengths (6.8 and 7.5 inches). Comparable tests with type-set in eight-point and 10-point type show that the line length limit is proportional The maximum efficient line length subtends an angle of about 22° of arc at the point of view.

On the basis of such tests, it may be said that a graphic field should not exceed 75 characters with the width of the lower case letter *e*, regardless of the size of the typeface. It follows that text in two adjacent columns on the same page are properly in separate graphic fields, and text in different parts of the same column are often in separate graphic fields. These distinctions are essential to an understanding of the way text and figures are usually laid out in hand-manipulable macrographic records, of the way such records are normally accessed in reading, and why such format does not assure efficient visual access to the same graphic fields from micrographic storage.

In my copending application, Ser. No. 733,103 now U.S. Pat. No. 3,512,142 filed May 29, 1968, (G3–81A) I describe a novel system for micrographic storage and visual retrieval. The present invention is directed to novel products and methods which can be used to manufacture the micrographic storage records which can be used in such system.

GLOSSARY

Adequate and unambiguous terminology to describe some of the concepts involved in this invention has not been found in the art. The following definitions are proposed for certain terms used in the following specification and claims:

A *graphic field* is defined as a rectangular coplanar array of related points, lines, colors or characters all of which may be read or recognized by a human observer from a single point of view, for example, a short paragraph of text is a graphic field.

A *graphic superfield* is defined as a graphic field which contains significant detail, subtending less than a minute of arc at the point of view. A map, chart, or picture is thus defined as a graphic superfield if and when it is necessary to read significant detail from a point at which the width of the entire field subtends an angle in excess of 22° of arc. It is important to recognize that a graphic superfield may be considered as a collage of adjoining and related coplanar graphic fields. Examples of side-by-side collages of graphic fields are found in ink-print publications where a picture or figure is spread over two or more columns or even over two pages. Examples of top-to-bottom collages of graphic fields are found in columns of printed text.

*Graphic field coordinates* are defined in terms of *right* (positive X), *left* (negative X), *up* (positive Y) and *down* (negative Y) with respect to the observer at the point of view beholding the field in a right-reading orientation.

*Point of view* of a graphic field is defined as a point in space on a normal to the center thereof from which the width of the field subtends 22° of arc, hence a graphic field and its associated point of view are unaffected by image reduction or enlargement.

A *graphic column* is defined as a graphic superfield consisting in a collage of graphic fields of the same width arranged head-to-foot in such a way that their left-hand margins are aligned, and with the upper limit of significant image detail of one field abutting directly beneath the lower limit of significant image detail of the preceding. A graphic column may consist in a serial array of paragraphs of text, of figures or of tables or of any combination thereof.

*Collating* is a procedure whereby graphic fields in a collection are serially ordered and fixed in one or more graphic columns with a minimum of waste image space between them.

A *graphic record* is defined as a coplanar array, usually numbered, of one or more graphic fields or superfields arrayed and fixed without discontinuities in a unitary recording medium. Hence, a page of specifications from a patent document is a graphic record.

*Graphic record coordinates* are defined as being parallel to those of the graphic fields recorded in the records.

A *misoriented* graphic field is defined as one in which the X-axis of the field is not parallel to that of the record in which it is fixed. In a sheet of patent drawings that must be turned with its long axis parallel to the horizon, the graphic fields are misoriented.

An *incomplete* graphic field is defined as a part of a graphic field that must be collated with another graphic field, which is recorded in another column or record for proper comprehension. Parts of a continued figure in patent records are incomplete graphic superfields. A column, of a paragraph at the foot of one graphic column the remainder of which is recorded at the top of a succeeding column is also an incomplete graphic field.

A *regular graphic record* is one in which one or more graphic columns of uniform width are serially ordered in the record. A page in an alphabetical telephone directory is a regular graphic record.

An *irregular graphic record* is one in which graphic fields of varying width are arranged more or less in serial order. A page in a newspaper containing graphic fields more than one column wide is an irregular graphic record.

A *random graphic record* is a graphic record in which two or more fields are not serially ordered. Figure sheets in patent documents are frequently random graphic records.

The *number of fields* in a graphic record is limited only by the physical characteristics of the recording medium and by convenience in storage and visual access.

A *graphic group* is defined as a set of serially related graphic records. Thus, a document such as a technical paper, recorded on more than one page (record) in a book or journal is a graphic group, as is a microfiche or an aperture card containing an ordered two-dimensional array of the images of said records, such as an "8-up" array of images of pages of text, arranged as follows:

| | | | |
|---|---|---|---|
| 1 | 2 | 3 | 4 |
| 5 | 6 | 7 | 8 |

A *grouped graphic record* (as opposed to a graphic group) is a graphic record in which fields of different types are grouped together for greater convenience. A page in which annotations, bibliographic citations, figures, tables, etc. are grouped together is an example of a grouped graphic record.

A *mixed graphic record* is one in which fields of different types containing text, annotations, bibliographic citations, figures and/or tables, etc., are intermixed, usually on the basis of the intellectual relationships between said fields regardless of type. Most pages from newsmagazines are mixed graphic records, containing illustrations distributed on a page in juxtaposition with related text.

A *volume* is defined as a serial array of graphic records. A bound volume of inkprint records in the form of pages printed on both sides may be considered topologically as a continuous ribbon folded accordion-fashion toward the user at the binding side, and away from the user at the side furthest from the binding. A microfilm strip or ribbon containing a serial arrangement of graphic records is a volume.

An *issue* is defined as s subset of a volume in which documents are periodically published. In a well-considered publication, the individual records in an issue are serially numbered with respect to the volume in which they are intended to be stored.

A *file* is defined as a collection of volumes.

A *document* is defined in its broadest sense as any writing, book or other object in which a communication is fixed for unambiguous access.

A *viewer* is defined as a projection microscope or system of projection microscopes which can project graphic images on a reflecting screen for viewing from the same side as the projector or on a translucent screen for viewing from the opposite side, from graphic records fixed on a transparent base medium and positioned on a stage.

PRIOR PRACTICES

Micrographic records, as ordinarily made today, are single copies of the pages of books or journals in which the graphic fields have been laid out for visual access in exactly the same format in which they appear in hand-manipulable, inkprint copies. The inkprint version is merely photographed one page at a time in one or more image reduction stages. Such records have heretofore been accessible either by serial entry into a volume of single copies of such records stored on a reel or in a cassette, or by coordinate address entry into a group of single copies of such records, arrayed in a unit microform, such as an aperture card, microfilm insert or a microfiche.

This invention is based, in part, on the realization that the formats developed over the course of the centuries for perusal of printed, hand-manipulable records are in many respects poorly suited for inspection by projection-type or remote display devices.

It has been observed that library users are often reluctant to take advantage of viewers to access micrographic records, preferring to use hand-manipulable macrographic records of the documents, perhaps blown-back photographically from the microform records. For example, a large research institution is reported to have found that a particular technical journal was being borrowed so frequently from a nearby university library that the institution's own library finally bought a conventional microform copy of it. But the result of this is said to have been that use of the journal dwindled off to nothing, for the reason that people simply would not put up with the microform viewing systems available to them. It is easy to deduce from such behavior that microform storage and retrieval systems often fail because they do not meet psychophysical requirements for systematic visual examination of documents. The art, however, has not heretofore proposed any reformatting of the graphic fields in inkprint records into fewer records and different arrangements specifically designed for better micrographic storage for projection or remote visual accession. It may be that the art has been deterred from making such proposals by the anticipation that such reformatting of documentary records would of necessity be an expensive operation requiring a great amount of human labor. A purpose of this invention is to minimize the labor and cost involved in producing more satisfactory micrographic records for visual access in viewers or by remote electronic display. The method does not contemplate any mutilation of the original document.

Scientific and technical books, journals, scholarly publications and other reference documents are usually, for the sake of copyright protection as a class A work, published in the form of inkprint records associated together in volumes or issues of volumes. The format used in inkprint documentary records, that is, the distribution of the constituent graphic fields over the several pages and their particular arrangement on each page is highly dependent upon the needs of inkprint technology and the retrieval procedures used to access such documents are highly dependent upon the use of the hands and the way the records may be manually indexed, folded and positioned. Such use of the hands is not practical in viewing micrographic records; however, conventional micrographic viewing systems do not make up for this loss of manipulability by simplifying the format in which graphic fields are arrayed.

In such inkprint documents, only a limited use is made of graphic fields grouped by type. Ordinarily, only commentary, bibliographic and other reference material are grouped at the end of the document. Perhaps because a patent document is prepared using lithography for the drawings and letterpress printing for the specification, the figures are currently grouped separately from the text; in most other documents, however, figures and tables are found distributed throughout the text. When such documents are presented in microform, such distribution leads to considerable difficulty and waste of time in addressing (finding) a particular figure or table each time that viewing of it is needed.

The use of two-dimensional arrays of graphic records such as the "8-up" grouping, described above, also contributes to addressing difficulties. It will be noted that such two-dimensional groups of records are serially discontinuous, that is, they always require a greater number of regressions along the Y-axis than serial access to the same fields, if fixed in regular unitary graphic record. It will be further noted that graphic fields in a regular graphic record are more directly addressable in terms of X and Y coordinates than the same fields in an irregular graphic record, a random graphic record, or a group of records, all of the latter requiring additional search procedures. In reading a hand-manipulable page of a typical three-column technical journal, the typical reader moves the copy a comfortable distance for viewing a particular part of a particular column. This helps to move distracting material from the reader's field of vision. For convenience, he often folds the document for greater maneuverability, or to take up less work space, and reorients the document to right a misoriented field. These options are not usually available to the microform user. A regular micrographic record, however, may be displayed field-by-field and column-by-column, with distracting elements removed from the field of vision, with the graphic fields uniformly enlarged for a comfortable viewing distance, and uniformly addressable by column number and position in said column.

Reading from micrographic records with viewers differs from reading hand-manipulable inkprint records in several other important respects. In an inkprint publication, a graphic column may be discontinued in the middle of a paragraph, usually in the middle of a sentence. If the same format is used in displaying the record on a micrographic viewer, the reader must complete the first portion of the paragraph or sentence at the bottom of the display on the viewer, retaining the partial thought of this text in his mind while operating a mechanical device to regress in Y and progress in X to access the remainder of the thought from the top of the next graphic field at the top of the next column. Only when this next partial field is in view can he hope to complete the thought started some seconds before, and often it is found that the first part of the paragraph or sentence must be redisplayed and reviewed to grasp the continuity of the paragraph as a whole.

Conventional microform viewing systems, therefore, suffer simultaneously the defects of presenting too many graphic fields in a single display area and of including related portions of an integral field in different display areas. It should be noted that the physical and intellectual effort expended by the user in repeatedly shifting back and forth between fields, in trying accurately to address particular fields in irregular records, all the while trying to maintain his thought continuity, is not recoverable in a subsequent viewing of the record by another user or even by the same user on another occasion. Without reformatting, the user's frustration and loss of time in using such systems, including those providing remote visual access, may indeed be so great that display systems for microform information retrieval, despite their cost savings, may never be competitive with the macroform, hand-manipulable retrieval records which can be obtained by blowback from conventional microform records.

DESCRIPTION OF INVENTION

In this invention, a novel grouping of photographic records is produced. This intermediate pickup grouping is made by a novel photographic process. From this intermediate grouping a regular micrographic record may be obtained which is characterized by elongated columns of graphic fields in a tightly packed array.

The pickup photographic film grouping contains a sequence of frames of uniform size, each frame of which contains a single graphic field imaging area of uniform size in a specified, fixed location within the frame. This grouping is a This grouping is a serial ordering, in a single column of graphic fields, with varying spaced between tops and bottoms of sequentially related fields and can be viewed using a conventional microfilm viewer. Even without collating such a serial ordering of records to merge the head-to-toe graphic fields, access to such fields is greatly improved over conventional micrographic access because the user is freed from the distractions of having parts of unrelated fields intrude upon his field of vision.

In the pickup film grouping, the preponderance of graphic records are of uniform width, although some variation in the width of certain graphic fields recorded therein is permissible without departing from the spirit of this invention. For example, it may be advantageous to photograph certain figures at a reduction ratio sufficient to put the entire length of the figure on one image-recording area of the pickup film, using appropriate isolating means. In some such cases, the resulting image of the isolated graphic field may be narrower than images of other graphic fields on the pickup film.

The pickup film record advantageously will contain marks, as described below, which can be sensed optically, mechanically, magnetically, etc., to aid in later collating by signalling or controlling, and which can be placed upon the pickup film during the photography or during the editing of the developed film.

In this invention, a regular graphic record may be produced from a group of irregular graphic records. In the process, misoriented graphic fields may be properly oriented, the graphic fields from random and irregular records may be reordered, the fragments of incomplete fields may be rejoined, and related graphic fields may be reassociated. The method is applicable to any document or group of records consisting in graphic fields, regardless of type of fields, their orientation, their relative dimensions, and their arrangement in or distribution among the several records in the group. The method includes isolating the constituent graphic fields of an original document and fixing them into a serial group of micrographic records of uniform width.

The order in which the isolated graphic fields are recorded in the serial grouping may be such as to order the fields taken from random graphic records, and to regroup the constituent fields by type or intellectual relation. In recording succeeding isolated graphic fields on succeeding frames of a photographic medium in a pickup camera, the direction in which the recording medium is advantageously displaced between succeeding frames is parallel to and in the same sense as the Y-axis of the graphic field so that the tops of succeeding graphic field records are fixed sequentially below but not necessarily adjacent to the bottoms of preceding field records.

The uniform width of the grouping of records is produced by varying the reduction ratio, where needed, so that the image of the field fills the rectangular recording area between its two sides. Thus, in producing the record grouping, a graphic field is isolated and photographed at a reduction ratio sufficient to fill the recording area from side-to-side, and when a graphic field in the document is encountered which has a different width, the reduction ratio is changed so that the record of the second field will fill its recording area from side-to-side, and thus produce a grouping of uniform width from graphic fields of nonuniform width.

The reduction ratio in which the isolated graphic fields are recorded may be varied either by varying the camera-to-object distance (in the case of a lens of fixed focal length) or by varying the focal length of the lens (for example, by Zoom optics) or both. The focusing of the graphic fields may be entirely manual, such as by motion of the lens of the camera to and from the image plane, or may be mechanically predetermined, based upon the distance of the camera from the image plane. In the latter situation, visual reference and manual means will generally still be employed for fine focusing.

Isolation of a graphic field may be accomplished, at least in part, by such adjustment of the reduction ratio and/or the camera position so that graphic detail from adjacent fields falls outside the graphic field recording area at the top and sides thereof. Additional isolation, when required, may be accomplished by masking in the object plane.

Proper registration of the field to be recorded on the pickup film may be assured by visual reference to the optical image of the isolated field in a view finder. Registration lines may be etched on the ground-glass view-screen of the camera to show the margins of the graphic field recording area and, advantageously the location of adjacent fields for recording sensible marks. Alternatively, such registration lines may be projected from the camera on to the document copy.

The position of the pickup camera with regard to each isolated graphic field of the document is advantageously adjusted to bring the upper extremity of the graphic field image into coincidence with the upper limit of the graphic field recording area in each frame. Such positioning may thus serve to isolate the particular field being photographed from image detail in the graphic field immediately above it in the original record. When a graphic field, misoriented in the original record, is to be photographed, the pickup camera may be rotated and positioned to bring the top of said field into coincidence with the upper limit of the graphic field recording area.

Ordinarily, adjusting the image reduction ratio and positioning the top of the image of the field to be isolated at the upper extreme of the graphic field recording area will serve to isolate the image of the graphic field being recorded from image details in adjacent fields above and to either side in the original record. Since graphic fields vary in length-to-width ratio, additional isolation must be provided along the remaining side, usually the bottom, to mask unwanted image detail. Advantageously, such masking is performed at the time the graphic field is being photographed by positioning along the bottom of the field to be isolated a sheet of opaque white material, e.g., paper. When developed as a negative, the image of said white mask will be recorded as an opaque area containing no image detail and through which no light may pass.

An important aspect of the above type of isolation of graphic fields is that when the negative image is optically projected onto a further photosensitive recording medium, the recording area on which the image of the mask is projected is unaffected, so that the top of the image area from the next succeeding frame may be recorded therein. Where a succession of such graphic image record areas are projected in order along a length of photosensitive film with the image of the top of each succeeding image positioned at the top of the masking area of the preceding image, a collated column is produced in which unwanted "white space" containing no graphic detail has been eliminated.

In an important aspect of this invention, an indexing strip of dark material, e.g., paper, is positioned on the document parallel to the Y-axis of each field being photographed at a distance where its image lies just outside the graphic field image area in the pickup camera, and the mask used to isolate the particular field across its bottom is superimposed, being of sufficient width to extend over the said Y-dimension indexing strip. In the developed negative, the image of said dark strip will be recorded as a clear Y-dimension indexing mark lying just outside the graphic field image area whose lower extreme is in line with the upper extreme of the masked portion of the graphic field image area. The length and/or positions of the extremities of these optically sensible marks may be used as references in collating the pickup images either by an operator directly or by sensing devices which signal the operator or control the collation process. In order to assure a precise top as well as bottom registration of this Y-dimension indexing mark, with respect to the graphic field limits along the Y-axis of the graphic field imaging area, an isolation masking technique similar to the field bottom isolation masking may be applied to the top of the field, similarly extending over the Y-dimension indexing strip.

It is also possible to place sensing marks upon the pickup record during editing. Such marks may be produced, for example, by abrading the photographic emulsion or by punching holes in the support which can be sensed by photosensitive or mechanical sensing elements to aid in the collating process using an automatic or semiautomatic photographic collator.

Advantageously, the marks placed on the pickup record, either during photography or during editing of the developed film will include marks to indicate the length of the graphic field image on each frame of film, to indicate an incomplete graphic field, to mark the beginning of the next column, and to indicate the beginning of the next succeeding record.

The kind of micrographic record which can be produced in this invention is a regular graphic record consisting in columns of graphic fields which can be viewed in a conventional "-Microfiche" viewer. Such a record advantageously has tightly packed columns, all of the same width, in each of which columns graphic field images are arranged head-to-toe, so as to avoid space containing no information. The columns can be uniformly arrayed across the record with a minimum of space, containing no information, between them.

Fields of differing type, such as figures, tables, footnotes, etc., may be grouped together, separately from text, or otherwise reassociated, regardless of the arrangement thereof in the document from which the record is made. Advantageously, all fields are oriented with respect to the record.

The ratio of length-to-width of the columns may greatly exceed that normally encountered in conventional inkprint records, whereby each column may contain a great many more graphic fields than generally provided in the layout of inkprint copy. Among the advantages of such an arrangement of graphic fields in a record are more direct access to a specified field, in terms of column number and position therein. None of the graphic fields in such an array need be incomplete, and annoying interruptions for regressions in Y between columns are far fewer.

Further, such an arrangement affords substantially higher packing density of graphic fields at the same total image reduction ratio. For exampled, in the array described the text from nearly twice as many pages of specification of a patent document can be recorded, at the same overall reduction ratio, in the same record area as proposed for the 8-up arrangement previously described and proposed for micrographic recording of U.S. patent documents for access by viewers. This greater packing density thus provides for inclusion of a greater number of graphic field images in a single micrographic record, all parts of which may be accessed without changing records.

DESCRIPTION OF DRAWINGS

The novel method and pickup film product will be more readily understood by a consideration of the enclosed drawings which should be considered illustrative only and not limiting.

In the drawings:

In FIG. 1, there is illustrated a pickup camera 10 which has been adapted from a 35 mm. single-lens reflex camera of a standard type. This is supported through a bracket 12 and a standard 15 on the base 18. The camera is held with the optical axis of its lens system 20 perpendicular to the plane of the base 18. The camera 10 has the standard features of a single-lens reflex 35 mm. camera, including a programmed, between-the-lens shutter 22, and the ground-glass view-screen 25 to which the image to be photographed is transmitted by the first surface mirror 27 which is hinged at 28 for movement away from the optical axis toward the viewplate 25 upon motion of the shutter release mechanism.

Figures 1, 2, 3, 4:
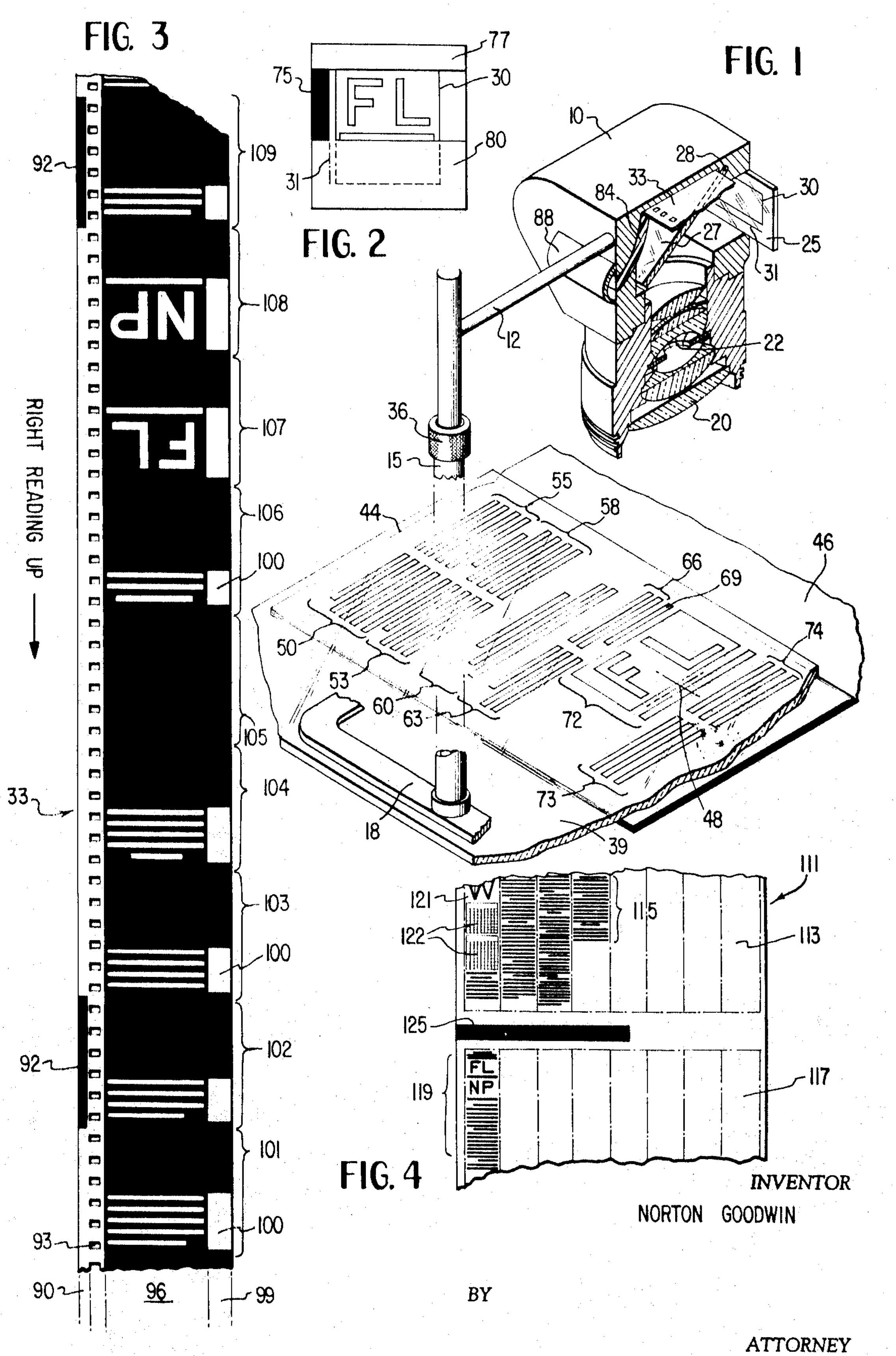
FIG. 1 represents an inkprint record, specifically, a page from a journal, reduced in size, positioned for a particular graphic field contained therein to be photographed by a pickup camera, which is shown partially cut away, partially in cross section and partially in phantom lines.
FIG. 2 represents the image of a particular graphic field correctly registered for photographic pickup in the camera as it appears in the pickup camera sighting means.
FIG. 3 shows a serial group of intermediate micrographic records according to this invention.
FIG. 4 is a section of a strip of micrographic records of the kind which may be produced by this invention containing positive images of collated graphic fields.

The ground glass view-screen 25 is reference-marked in the conventional manner to image a rectangular frame 30, registering the outer edges of the graphic field recording area in which the images of graphic fields picked up from the document are photographically fixed for a subsequent photographic transfer to the collated record. When sensible marks are to be recorded near the graphic field recording area of a pickup frame for subsequent use in collating, the ground-glass screen is also advantageously marked with a reference mark 31 for correctly positioning a Y-dimension indexing strip along the left-hand margin of copy to be photographed.

The entire pickup image received by the lens system 20 and projected on the view-screen 25 when the mirror 27 is interposed is further transmitted to the operator as the image seen in FIG. 2, by a conventional image erecting optical expedient, such as a pentaprism, which is not shown in FIG. 1.

The same entire pickup image is projected onto the emulsion side of film 33 when the first surface mirror 27 is rotated around hinge 28 toward the view-screen and the shutter 22 is opened. This shutter may be of the between-the-lens type shown or a behind-the-lens type, both of which are conventionally used in single-lens reflex 35 mm. cameras. In the embodiment shown, the shutter is programmed to remain open during use of the finder with the reflex mirror in place, and to remain closed at all other times except when released to open for a predetermined exposure duration in the conventional manner.

The film 33 is preferably single-perforated 35 mm. film. It has sprocket holes which are, according to ASA standards for 35 mm. film, 2.794 mm. long and spaced 4.750 mm. from each other on center. When using such film for pickup, the graphic field recording area in each frame of pickup film advantageously is square and when this single-perforated 35 mm. pickup film is employed, a graphic field recording area of 23.75 mm. in each dimension can be employed. Such an area fills the space outlined by the reference mark 30 shown on the view-screen of FIG. 1 and in FIG. 2. When these graphic field records are to be subsequently projected to collate the graphic fields fixed therein, the rectangular projector aperture through which the developed graphic field image is to be projected will advantageously have these same dimensions of 23.75 mm. by 23.75 mm.

The camera 10, when using such pickup film advantageously has a camera aperture of about 27.75 mm. wide by about 28.75 mm. along the film length. When one side of the aperture is located 5.0 mm. from the sprocket hole side of the pickup film, to avoid interference by the sprocket holes, abut 2.25 mm. of unused film along the other edge remains for support of the pickup film at the camera aperture. When the graphic field recording area is located approximately 1 mm. from the sprocket hole side of the camera aperture, a channel approximately 3 mm. wide remains along the other side to accommodate the Y-dimension indexing mark.

If the tops of the square 23.75 mm. graphic field recording areas are spaced on the pickup film at six sprocket hole intervals, that is, if the camera is designed to move the film six sprocket holes between each pickup frame, 28.5 mm. of film length are brought down for each exposure. With a camera aperture of 28.75 mm., this means that there will be an exposure overlap of 0.25 mm. along the pickup frame between successive pickup exposures and no unexposed film area between successive pickup frames.

The bracket 12 is telescopically held on the standard 15 by means of the clamp 36 which is readily adjustable to allow upward and downward movement of the camera 10. In FIG. 1, a transparent holddown plate 39 has been placed upon a graphic record 44 contained in a journal issue 46. On this plate, the base 18 has been placed in such a position that the direction of travel of film 33 in camera 10 is antiparallel to the Y-axis of the image area on the page which is to be photographed. As shown in the figure, the optical axis of the camera lens system 20 is directed to the point 48.

The graphic fields of the original graphic record 44 have been identified by numbers, as follows:

50 is a graphic field consisting of the first paragraph in the record; 53 is an incomplete graphic field consisting of the first four lines of the next paragraph; 55 is another incomplete graphic field containing the final four lines of the paragraph started in 53; 58 is the final graphic field of the journal article containing the citation of references.

60 is a graphic field containing the title and abstract of the next article appearing in the journal; 63 is an incomplete graphic field containing the beginning of the first paragraph of this new article; 66 is another incomplete graphic field containing the final lines of this paragraph; 69 is an incomplete graphic field containing the first line of another paragraph, which is continued below field 72; 72 is a graphic field containing a figure along with its caption. Fields 73 and 74 are incomplete graphic fields containing the remainder of the paragraph begun in 69.

FIG. 1 shows the point 48 as centered on the middle of the X-axis of a particular field, 72, which is to be photographed. The height of the camera 10 has been adjusted along standard 15 so that the in-focus image of the particular field fills the graphic field recording area registration frame 30 from side-to-side.

For purposes of clarity, FIG. 1 shows the page ready to be photographed, but with part of the base 18 in phantom lines, and without the strip and masks which are used to isolate and index the Y-dimensions of the graphic fields being photographed by providing sensible marks on the pickup film 33. When used, the Y-dimension indexing strip generally will be placed on the page 44 with the top and bottom field isolation masks superimposed before the page is overlaid with the holddown plate 39 although the top field isolation mask may be integral with the plate.

The Y-dimension indexing strip, the image of which is shown on FIG. 2 as 75, is black; while the top and bottom field isolation masks, the images of which are shown in FIG. 2 as 77 and 80, respectively, are white. These masks may be of paper or plastic. In addition, the black strip, since it is placed adjacent the page, may be pressure-sensitive tape, etc. Since it is preferred to have the edge of the black strip closest to the graphic field in registry with line 31 as it appears on the viewscreen of FIG. 2, this strip is advantageously moveable, and located along the edge of a flat member wide enough to project beyond the plate 39. Also, it is advantageous to use a black strip long enough to lie along all of the graphic fields in a recording having a common left-hand margin. When used, it preferably will be positioned on the original record 44 with its right-hand margin parallel to and just to the left of the graphic field to be photographed.

The top field isolation mask 77 may, as mentioned, by fastened to or integral with the bottom surface of the holddown plate 39. Both field isolation masks 77 and 80 are placed atop the black Y-dimension indexing strip so as to cover the top and bottom thereof with their images completely filling the pickup camera aperture from side-to-side. The top field isolation mask 77 is positioned with its bottom edge parallel to and coincident with the top of the field to be photographed and extending leftwards over the black Y-dimension indexing strip 75. The bottom field isolation mask 80 is placed with its upper edge parallel to and coincident with the bottom of the field to be photographed and similarly extends leftwards over the black Y-dimension indexing strip 75.

After placing the masks, the plate 39 is superimposed on the recording strip and masks to serve as a rigid support for the camera base 18, which is then placed thereon. After the camera-to-object distance has been adjusted to the desired height, the camera base 18 is moved up or down with respect to the graphic field until the image of the upper edge of the field is coincident in the viewer with the upper edge of the graphic field registering frame 30 as shown in FIG. 2. At this point, the black Y-dimension indexing strip 75 may be further adjusted to bring its right-hand edge into coincidence with the reference mark 31 on the ground glass.

After adjusting strip 75 and the masks 77 and 80, the operator may press a lever of conventional type (not shown) to close the shutter 22, release the mirror 27, which moves out of the optical path, and reopen the shutter 22, transmitting the image of the selected graphic field, along with its related masks, to a frame of film as defined by the camera aperture. After photographing this selected field, the camera film advance mechanism is actuated, thereby positioning a fresh pickup frame in the camera aperture, repositioning the mirror 27, so as to project images on the viewing screen 30 and reopening the shutter 22.

The pickup camera is then ready to record the next graphic field in the serial group. When this next graphic field is of the same width, and located immediately below the one previously recorded, no adjustments need be made to the camera height, camera focus, or the position of the Y-dimension indexing strip. The procedure in this case would involve first moving the upper field isolation mask downward to where it touches or is coincident within the lower field isolation mask. The lower field isolation mask is then gradually drawn down along the field until it is coincident with the bottom of the next field to be recorded. Both of these isolation mask adjustments may be made with the holddown plate 39 and camera base 18 in their original positions. The camera base 18 may then be moved downwardly to bring the image of the upper edge of the new field into coincidence in the viewer with the upper edge of the graphic field registration frame 30; no further adjustment is needed for the next exposure, and so on.

The sequence in which graphic fields in a document are recorded is generally in logical order, although different types of fields may be grouped where such arrangement is desired.

In FIG. 1, the camera 10 has also been adapted to photographically record further sensible marks on the film 33, for example, to indicate that a graphic unit in a frame of pickup film is incomplete. Such means advantageously may be means for exposing the entire margin of film outside the sprocket holes when an incomplete graphic unit is photographed. FIG. 1 shows one such modification which may be employed. In this figure an optical fiber-type material 84 is included in the camera leading from the margin of the film outside the sprocket holes to the outside of the camera. This optical fiber-type material may be a curved sheet of acrylic or other synthetic resin having light conductive and channeling properties, a wide curved brush of fibers made of such resin, etc. An elongated chamber 88 is provided on the outside of the camera to hold an illumination source so that light from this source may be conducted through the optical fiber to the margin of the film. Suitable means to power the illumination source (not shown) are also provided. Advantageously, the fiber optic component 84 will be wide enough to expose a length on the film at least as long as the pickup frame, in the embodiment shown, 28.75 mm. When the first part of an incomplete graphic field such as 53 or 63 is to be photographed, the illumination source may be energized to expose the channel the sprocket holes through the optic fiber to put an "continued" mark on the film section.

FIG. 3 is a length of 35 mm. pickup film, developed as a negative, represented full-size with the emulsion side down, in which images of the graphic fields of the original journal record are fixed in a serial grouping of separate pickup frame records. The graphic fields of original record 44 appear as negative images on this film 33. The width of this film may be divided into channels, from left to right in FIG. 3, as follows: image-right sensing channel 90, which contains the sensible marks 92, produced by an illuminant in the pickup camera, sprocket hole channel 93, graphic field recording area channel 96, and image-left sensing channel 99 which may be transparent in portions such as 100. This channel takes the place of the second perforation channel normally provided in double-perforated film. Transparencies 100 are the Y-dimension indexing marks of their respective graphic fields corresponding to the length of black strip 75 not covered by top and bottom field isolation masks 77 and 80.

The spaces between successive pickup frames are completely blackened on the film record 33, due to overlapping exposure of the film to images of isolation masks 77 and 80. Using the exemplary dimensions given above, of the 28.5 mm. length brought down for each exposure, 0.25 mm. at the top will have already been exposed by the image of the bottom isolation mask 80 in the previous exposure and will be reexposed by the image of the top isolation mask 77 in the next frame because the camera aperture is 0.25 mm. longer than the length of fresh film brought to the aperture. This assures that the entire length of channel 99 will be exposed and darkened except where images 100 of the Y-dimension indexing strips 75 are recorded. This uninterrupted channel of sensible masks can serve in precise manual or automatic collation of the graphic fields recorded in channel 96.

It also will be noted from a consideration of FIGS. 1 and 3 that while the original record 44 has graphic fields varying in width, such as 53, 60 and 72, the images thereof 102, 106 and 107 on the pickup film 33 are of uniform width. This uniformity is produced by varying the reduction ratio in the use of the pickup camera. Also, it will be noted that the centers of the fields of record 44 are in some cases out of alignment with those above and below. For example, the center of field 72 is out of line with those of fields 55, 58, 66 and 69, being displaced to their left. Likewise, the X-axis centers of fields 50, 53 and 63 are to the left of that of field 60. On the pickup film 33, however, all the graphic field images are arrayed with their X-axis centers vertically aligned.

On the pickup film, numbers 101, 102, 103, 104, 105, 106, 107, 108 and 109 denote exposure frames of the pickup camera and are numbered in the order in which the frames are exposed. In frame 101 channel 90 is unmarked; the graphic field recording channel 96 contains a negative image of graphic field 50 and in channel 99 the transparent portion 100 is the Y-dimension index mark denoting the position and length of the image of said graphic field 50 along the Y-axis of said frame 101. The remaining parts of frame 101 are fully exposed and opaque in both the graphic field recording channel 96 and the Y-dimension indexing channel 99.

In frame 102, channel 90 has been exposed and is thus marked to indicate that the graphic field recorded in this frame is incomplete; channel 96 contains the image of graphic field 53 and channel 99 contains the corresponding Y-dimension index mark and the remaining parts of frame 102 are fully exposed and opaque in both channels 96 and 99.

In frame 103, channel 90 is unmarked; channel 96 contains the image of field 55 and channel 99 the corresponding Y-index mark and the remaining parts of frame 103 are fully exposed and opaque.

In frame 104, channel 90 is unmarked, channel 96 contains the image of field 58, channel 99 contains the corresponding Y-dimension indexing mark and the remaining portion is exposed and opaque in both channels 96 and 99.

In frame 105 channel 90 is unmarked and all of the imaging areas in channels 96 and 99 are fully exposed and opaque as a result of photographing a sheet of blank white material. Complete absence of a Y-dimension indexing mark in a particular frame may be used to indicate the end of a group of micrographic records to be collated in a single micrographic record.

In frame 106, channel 90 is unmarked, channel 96 contains the image of graphic field 60, channel 99 contains the corresponding Y-dimension indexing mark and the remaining portions of channels 96 and 99 are fully exposed and opaque.

In frame 107 channel 90 is unmarked, channel 96 contains the image of field 72, channel 99 contains the corresponding Y-dimension indexing mark and the remaining portions of channels 96 and 99 are fully exposed and opaque. It will be noted that in the original record fields 63, 66 and 69 would normally follow field 60. Field 72, however, contains a figure and it will often be advantageous in visually accessing micrographic records in viewers or with remote electronic display devices to have all the figures in a record grouped at the beginning thereof.

In frame 108, channel 90 is unmarked, channel 96 contains the image of another graphic field in the same journal article, taken from another record (page) in the journal issue not shown FIG. 1; channel 99 contains the corresponding Y-dimension indexing mark and the remaining portions of channels 96 and 99 are fully exposed and opaque.

In frame 109, channel 90 has been exposed and is thus marked to indicate that the graphic field recorded in this fame is incomplete; channel 96 contains the image of graphic field 63 and channel 99 contains the corresponding Y-dimension index mark and the remaining parts of frame 102 are fully exposed and opaque in channels 96 and 99.

FIG. 4 shows a section 111 of film containing portions of two regular micrographic records which can become film inserts for aperture cards or can be used as masters for making such inserts by contact photography. These regular micrographic records contain positive images of all the graphic fields of the original record shown in FIG. 1. As can be seen, these graphic fields have been reduced to a uniform width, regrouped and reordered, according to their positions in the intermediate pickup film grouping and have been collated.

The uppermost micrographic record 113 contains, at section 115, the collated images of fields 50, 53, 55 and 58 of FIG. 1. Lower micrographic record 117 contains in section 119 the collated images of fields 60, 63, 66, 69 and 72 appearing in FIG. 1 and also the figure appearing in frame 108 of the pickup film section 33. It will be noted that upper micrographic record 113 contains an array in which drawing 121 and tables 122 taken from the article which ends with field 58 in the original record have been placed immediately after the title thereof in the first column of the micrographic record. Between panels 113 and 117 a record indexing mark 125 may be placed during the collation.

The sensible marks of the pickup film may be employed in collating as follows:

The Y-dimension marks may be used in photographically collating the graphic fields recorded in pickup film 33 in head-to-foot columns, to provide a measurement of the length required to clear the lower edge of each graphic field projected with the upper edge of the next graphic field to be projected. Also, the operator may measure the length of the Y-dimension indexing mark in each frame to determine whether there is room enough at the foot of the column currently being recorded in the photosensitive medium to receive the entire image recorded therein.

The amount of displacement of the photosensitive medium 111 along its Y-axis required to clear the graphic field of each frame is the length of the Y-dimension indexing mark times the reduction ratio between the images on pickup film 33 and the collated micrographic records being recorded on film 111. If there is insufficient room in the column, the recording medium 111 is advanced one column width in the X-direction and is regressed in the Y-direction to the top of the next column. If no further column position is available in the photosensitive medium, the next frame will be recorded in the first available column position in the next succeeding record.

The appearance of a continuation mark such as 92 can signal the operator so that he will measure the Y-dimension index marks of the next two frames to determined whether there is room in the column for the images in both. The appearance of a frame containing no Y-dimension indexing mark can signal the operator that the next frame is to be recorded in the first available column position in the next micrographic record to be collated. Such will be the case when frame 105 appears in the operator's view.

It will be noted that a little more labor is required in making an intermediate pickup grouping according to this invention than in the conventional creation of a microfilm record where the operator subserviently photographs a document page-by-page, retaining the original page format designed for hand-manipulable access. However, the novel grouping so produced is itself so far superior for micrographic access that the small additional labor readily amortizes itself in the total time and effort saved by users. It will be noted that the more such a grouping is accessed the greater the savings.

Further, in most situations involving running text, there will be few camera adjustments required, since the majority of graphic fields in most documents are already of uniform width. Also, the pickup record may be marked with sensible marks, as described, to enable automatic machinery to collate the images to produce a final micrographic record having the advantages of a regular graphic record described above. In such records graphic fields from a number of macrographic records usually are redistributed over a smaller number of micrographic records.

It will be noted that neither the intermediate serial groups of micrographic field records nor the collated micrographic records disclosed herein and producible by methods claimed herein contain graphic material in format appropriate for reader-printer blowback or the making of offset masters for inkprint copy-making. An important objective in this invention is to facilitate display access to the contents of documents without making it easier to proliferate unauthorized copies in hand-manipulable form.

I claim:

1. A method for producing a serial grouping of related micrographic records from related document records containing a multiplicity of related graphic fields of nonuniform width which comprises isolating a first graphic field in said records having a first linear width, positioning means having optical properties such as to record in a first frame of a recording medium a first sensible mark indicating precisely the height of the image of said first graphic field, photographing on said first frame of said recording medium said first graphic field at such reduction ratio as to produce a photographic image of a specific width and said means to produce said first sensible mark, isolating a second graphic field in said records having a second linear width, positioning means having optical properties such as to record in a second frame of said recording medium a second sensible mark indicating precisely the height of the image of said second graphic field, and photographing on said second frame of said recording medium said second graphic field at a second reduction ratio as to produce a photographic image of the same specific width and said means to produce said second sensible mark.

2. A method according to claim 1 in which the recording medium is advanced from said first frame to said second frame toward the bottom edge of the previously recorded graphic field image.

3. A method according to claim 1 which includes the step of changing the distance from recording medium to graphic field between said first photographing step and said second photographing step to secure said second reduction ratio.

4. A method according to claim 1 which includes the step of changing the focal length of an image forming system between said first photographing step and said second photographing step to secure said second reduction ratio.

5. A method according to claim 1 in which the specified width is the width of a channel in which both said graphic images are recorded.

6. A method according to claim 1 in which said graphic fields are positioned to be recorded with their tops coincident with the tops of the graphic field image-recording area in said frames.

7. A method according to claim 6 in which said tops are brought into registry by visual reference to a line in a view finder.

8. A method according to claim 6 in which said tops are brought into registry by reference to a line projected from a camera on to said graphic field.

9. A method according to claim 1 in which the positioning of said means is such that the said first sensible mark is precisely coextensive with the height of the image of said first graphic field and the said second sensible mark is precisely coextensive with the height of the image of said second graphic field.

10. A method according to claim 1 in which means used to isolate each said field have optical properties such as to render opaque the portion of the recording medium between the images of fields in succeeding frames of the recording medium.

11. A method according to claim 1 in which the photography employs a camera having a camera aperture longer than said frames, thereby producing in succeeding exposures a double exposure of a strip at the top of each succeeding frame, and means are used to isolate each said field at its top and its bottom having optical properties such as to make opaque all the recording medium between images in successive frames.

12. A method according to claim 1 in which at least one margin of at least one frame is exposed to actinic light and the medium is developed after exposure to said graphic fields to produce at least one fully opaque margin on said group, wherein optically sensible marks may be made by abrasion.

13. A method according to claim 1 wherein the related records contain a misoriented graphic field further including orienting the image of said misoriented field with respect to the serial grouping, which comprises rotating the axis of a camera with respect to the document record containing said misoriented graphic field.

14. A serial grouping of related micrographic records of a document which comprises a photographic medium having images of graphic fields of uniform width and different heights recorded thereon, the centers of said images being arrayed along a common Y-axis, said images being arranged such that the top of a succeeding image is ordered below the bottom of a preceding image and is spaced therefrom, and optically sensible marks are recorded on said medium for indicating the height of respective graphic fields.

15. A serial grouping according to claim 14 in which the graphic field images recorded in successive frames are taken from mixed graphic records and are serially related by type.

16. A serial grouping according to claim 14 in which said images are spaced from each other by continuously opaque sections of film.

17. A serial grouping according to claim 14 in which each of the optically sensible marks has a length precisely coextensive with the height of a respective graphic field and the marks indicate the length of the image areas of said graphic fields.

18. A serial grouping according to claim 14 in which marks indicate the beginning of a new column.

19. A serial grouping according to claim 14 in which marks indicate the beginning of a new record.

20. A method for producing a regular micrographic record which comprises collating the images in the serial grouping of claim 14 head-to-foot.

21. A method according to claim 20 in which the collating includes forming a plurality of micrographic columns.

* * * * *